June 20, 1950    S. B. HASELTINE    2,512,016
FRICTION SHOCK ABSORBER FOR
RAILWAY CAR TRUCK SPRINGS Filed May 15, 1948    2 Sheets-Sheet 1

Inventor:
Stacy B. Haseltine.
By Henry Fuchs,
Atty.

June 20, 1950 S. B. HASELTINE 2,512,016
FRICTION SHOCK ABSORBER FOR
RAILWAY CAR TRUCK SPRINGS
Filed May 15, 1948 2 Sheets-Sheet 2
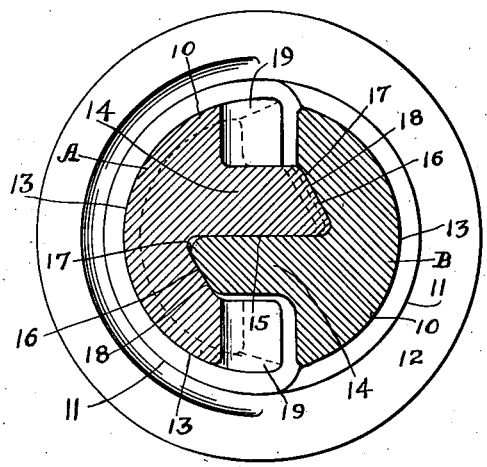
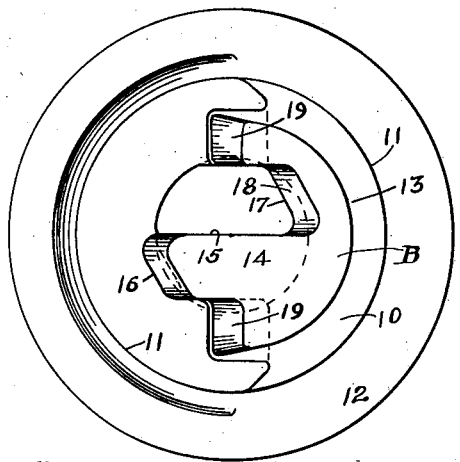
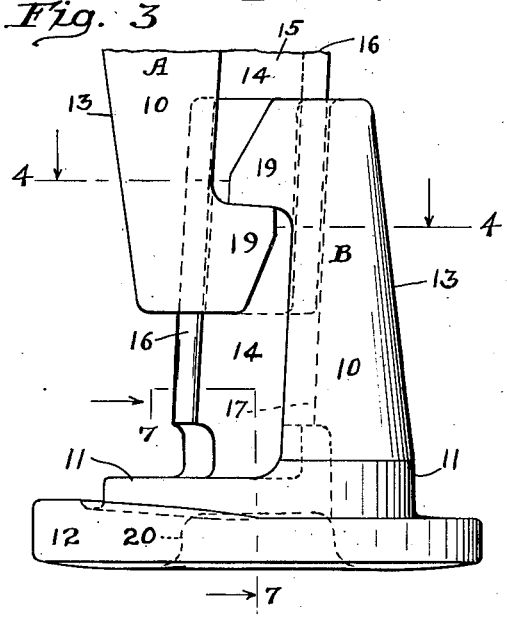
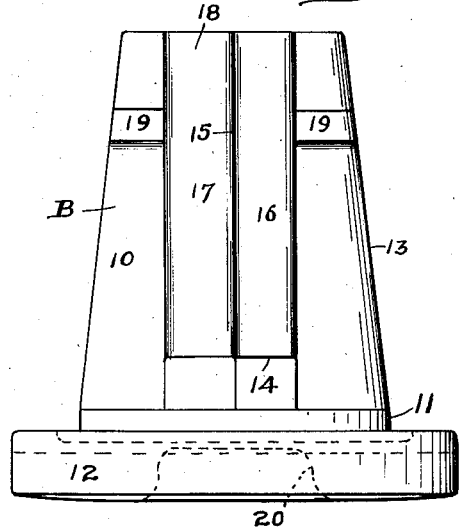
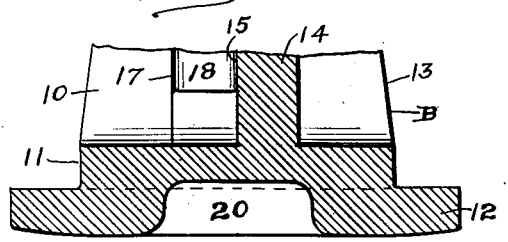
Inventor:
Stacy B. Haseltine.
By Henry Fuchs.
Atty.

Patented June 20, 1950

2,512,016

UNITED STATES PATENT OFFICE 2,512,016

FRICTION SHOCK ABSORBER FOR RAILWAY CAR TRUCK SPRINGS

Stacy B. Haseltine, La Grange, Ill., assignor to W. H. Miner, Inc., Chicago, Ill., a corporation of Delaware Application May 15, 1948, Serial No. 27,207

5 Claims. (Cl. 267—9)

This invention relates to improvements in Friction Shock Absorbers for snubbing the action of truck springs of railway cars.

One object of the invention is to provide a friction shock absorber especially adapted for snubbing the action of railway car truck springs, comprising a pair of relatively lengthwise slidable friction elements and spring means opposing relative lengthwise movement of the friction elements with respect to each other, wherein the friction elements have cooperating friction surfaces and interengaged guide portions which are forced into wedging engagement with each other by the spring means to press the friction surfaces of the posts together.

Other objects of the invention will more clearly appear from the description and claims hereinafter following.

Figure 1:
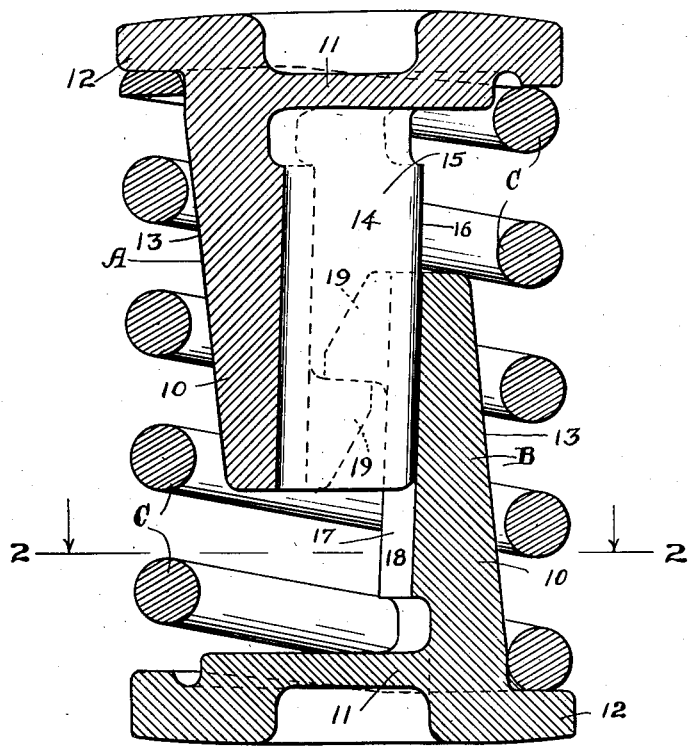
Figure 2:
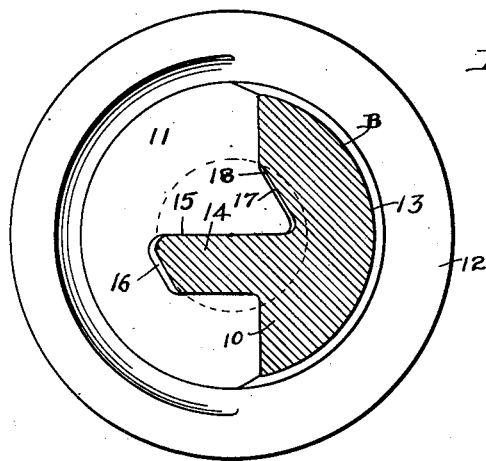

In the accompanying drawings forming a part of this specification, Figure 1 is a transverse, vertical sectional view of the improved shock absorber. Figure 2 is a horizontal sectional view, corresponding substantially to the line 2—2 of Figure 1, with the spring omitted. Figure 3 is a front elevational view of Figure 1, partly broken away, and with the spring omitted. Figure 4 is a horizontal sectional view, corresponding substantially to the offset line 4—4 of Figure 3. Figure 5 is a top plan view of the bottom friction element shown in Figure 1. Figure 6 is a side elevational view of the bottom friction element shown in Figure 2, looking from right to left in said figure. Figure 7 is a broken, vertical sectional view, corresponding substantially to the line 7—7 of Figure 3.

My improved shock absorber, as illustrated in the drawings, comprises broadly top and bottom similar friction elements or posts A and B and a spring resistance C.

The friction posts A and B are identical, each post comprising a vertically disposed body portion 10, a base member 11, and a laterally extending, annular flange 12, projecting from said base portion, concentric with the vertical axis of the device, and forming a follower integral with said post.

The two posts A and B are reversely arranged, that is, the post A is inverted with respect to the post B, as shown most clearly in Figure 1. As shown in Figure 1, the follower 12 of the post B is located at the bottom of the device and has the body portion 10 of the post upstanding therefrom, while the follower of the post A is located at the upper end of the device and the body portion 10 depends therefrom. The body portion 10 of each post is rounded on its outer side and tapers upwardly, as indicated at 13. On the inner side, each post presents a longitudinally extending, laterally inwardly projecting flange or plate member 14, which is at one side of a plane coincident with the central longitudinal axis of the mechanism. The side of the plate member 14 facing the central longitudinal axis of the mechanism presents a lengthwise extending, substantially flat friction surface 15. The outer longitudinal edge of the plate member 14 is inclined, as shown, and is beveled off or cut away to present a transverse wedge face 16. The plate members 14—14 of the two posts are disposed side by side and have the friction surfaces 15—15 thereof in engagement with each other. The wedge-shaped outer edge of each post is engaged in a cooperating, longitudinally extending groove 17 of wedge-shaped, transverse cross section in the other post, at the inner side of the plate member 14 thereof, each groove 17 presenting a wedge face 18, which is engaged with the wedge face 16 of the cooperating plate member 14. The wedge faced edge of the plate 14 of each post and the cooperating groove 17 of the other post are preferably inclined, as shown, the inclination of the same being upwardly to the right, as shown in Figures 1 and 3. At the outer end thereof, each post is provided with a pair of stop lugs 19—19, which engage with the corresponding stop lugs of the other post to limit lengthwise separation of said posts. Each pair of lugs 19—19 and 19—19 of the two posts embrace the plate members 14—14 of said posts at opposite sides and form guides for preventing lateral separation of said plate members.

The followers 12—12 of the two posts are provided with central pockets 20—20, adapted to accommodate the usual spring centering projections of the top and bottom follower plates of a truck spring cluster of a railway car.

The spring resistance C, which is in the form of a helical coil, surrounds the posts A and B and bears at its top and bottom ends on the followers 12—12 of said posts, respectively. The interior diameter of the spring C and the spread of the posts are such that the inner sides of the top and bottom coils of the spring bear laterally inwardly on the vertical walls of the base portions 11—11 of the posts, that is, the inner side of the coil at the upper end of the spring bears on the vertical wall of the base member of the post A at the left hand side of the device, as seen in Figure 1, and the coil at the lower end of the spring bears on the vertical wall of the base 11 of the post B at the right hand side of the device, the spread of the posts being such that the upper end of the spring is displaced slightly to the left and the lower end portion thereof slightly to the right. The lateral inward pressure of the spring at opposite ends of the device is thus in a direction at right angles to the planes of the friction surfaces of the posts, thus forcing the plate members 14—14 edgewise in opposite directions and the wedge faces 16—16 thereof into wedging engagement with the wedge faces 18—18 presented by the grooves 17—17 of the respective posts to force the friction surfaces 15—15 into frictional contact with each other.

The improved shock absorber preferably replaces one or more of the spring units of a truck spring cluster of a railway car, being interposed between the usual top and bottom spring plates which cooperate with the cluster.

The operation of my improved shock absorber is as follows: Upon the spring cluster of the truck of a railway car being compressed between the spring follower plates of the cluster, the shock absorbing unit, which is disposed between said follower plates, is compressed therewith, thereby forcing the post A downwardly toward the post B. High frictional resistance is thus produced, due to the friction surfaces being wedged together by the wedging action of the cooperating faces 16 and 18, which are forced toward each other by the spring C. As compression of the device progresses, the pressure on the friction surfaces increases, due to the inclination of the cooperating wedging edge portions of the plate members 14—14 and the lengthwise extending wedge faces presented by the grooves of said posts.

Upon release of the mechanism, the posts A and B are restored to their normal position shown in Figure 1 by the expansive action of the spring C, longitudinal separation of the posts being limited by engagement of the stop lugs 19—19 and 19—19 with each other.

As will be evident, the arrangement of guided interengaged friction portions of the posts of the construction, as hereinbefore described and shown in the drawings, provides for great stability of the contacting members against separation under weaving conditions between the bolster and the side frame of the car, the friction members being held together by the spring induced wedging action between the interengaged portions of the same.

I claim:

1. In a friction shock absorber, the combination with a pair of relatively lengthwise slidable friction posts having longitudinally extending friction surfaces on their inner sides, and each post having lengthwise extending, transversely inclined wedge faces at inner and outer edges of the friction surface thereof, the inner and outer faces of one post cooperating respectively with the outer and inner faces of the other post, said wedge faces being angularly disposed with respect to said friction surfaces; of a spring opposing relative lengthwise movement of said posts toward each other and forcing said wedge faces against each other to press the friction surfaces into engagement.

2. In a friction shock absorber, the combination with a pair of friction posts having longitudinally extending, laterally inwardly projecting, platelike flanges in side to side engagement with each other on lengthwise extending, flat friction surfaces; of a longitudinally extending groove on the inner side of each post at the friction surface side of the flange thereof, said groove having a lengthwise extending wall laterally inclined away from said friction surface, the flange of each post having the longitudinal edge face thereof laterally inclined and in wedging engagement with said laterally inclined wall of the groove of the other post; and a spring surrounding said posts and yieldingly opposing relative lengthwise movement of the same toward each other, said spring exerting lateral inward pressure on the posts to force said platelike flanges into wedging engagement with the laterally inclined walls of said posts to press said platelike flanges together.

3. In a friction shock absorber, the combination with a pair of followers at opposite ends of the mechanism, said followers being movable toward and away from each other lengthwise of the device; of an inwardly projecting post on each follower having a lengthwise extending, laterally projecting, platelike flange provided with a friction surface on one side, said post having a longitudinally extending wall at the inner end of said friction surface of the flange thereof, said wall diverging laterally from said surface, the friction surfaces of said flanges of the posts being in lengthwise sliding engagement with each other, and the flange of each post having its longitudinal edge face transversely beveled and in wedging engagement with said diverging wall of the other post; and a coil spring bearing at opposite ends on said followers and yieldingly opposing relative lengthwise movement of said posts toward each other, said spring exerting lateral inward pressure on the posts to force said platelige flanges into wedging engagement with said diverging walls of said posts to press said flanges together.

4. In a friction shock absorber, the combination with a pair of friction posts having longitudinally extending, inwardly projecting, platelike flanges in side to side engagement with each other on lengthwise extending flat friction surfaces, said flanges having their outer edges inclined lengthwise of the mechanism; of a longitudinally extending groove on the inner side of each post at the friction surface side of the flange thereof, the grooves of said posts being correspondingly inclined to the outer edges of the flanges of said posts, each groove having a lengthwise extending wall, laterally inclined away from the friction surface of the flange of said post and in wedging engagement with the outer edge of the flange of the other post; and a spring surrounding said posts and yieldingly opposing lengthwise movement of the same toward each other, said spring exerting lateral inward pressure on the posts to force said platelike flanges edgewise against the laterally inclined walls of said posts to press said platelike flanges together.

5. In a friction shock absorber, the combination with a pair of friction posts having longitudinally extending, inwardly projecting flanges, disposed side by side in frictional engagement with each other, said posts being movable toward each other lengthwise of the mechanism; of a coil spring surrounding said posts, said spring yieldingly opposing lengthwise movement of the posts and forcing the same laterally inwardly toward each other to force said flanges toward each other in edgewise direction; and cooperating wedge faces on said posts and outer edges of the flanges thereof for wedging said flanges together in lateral direction.

STACY B. HASELTINE.

REFERENCES CITED

The following references are of record in the file of this patent:

UNITED STATES PATENTS

| Number | Name | Date |
|---|---|---|
| 2,091,783 | Lazna | Aug. 31, 1937 |
| 2,406,064 | Dath | Aug. 20, 1946 |
| 2,410,165 | Johnson et al. | Oct. 29, 1946 |
| 2,444,989 | Haseltine | July 13, 1948 |